Patented July 12, 1927.

1,635,576

UNITED STATES PATENT OFFICE.

JOHN HADFIELD, OF AKRON, OHIO, ASSIGNOR TO JOHN R. GAMMETER, OF AKRON, OHIO.

METHOD OF MAKING DIPPED RUBBER ARTICLES.

No Drawing.   Application filed January 12, 1927.   Serial No. 160,777.

This invention relates to methods or procedures for making dipped rubber articles.

The general purpose of the invention is to provide an improved method for effectively making dipped rubber articles from solutions of rubber and particularly aqueous solutions thereof, such as latex.

Particularly the invention has for its object the provision of a method whereby the deposit of a film of rubber on the form when dipped is effected by vulcanization of the film either partially or wholly.

The above and other objects of the invention are obtained by the procedure outlined below. It is to be understood that the invention is not limited to the particular form set forth.

The solution of rubber employed may, for example, be concentrated latex treated with a vulcanizing agent such as sulphur and a suitable accelerator of vulcanization such as dimenthyldithiocarbamic acid or tetramethylthiurammonosulphide to effect a cure at a comparatively low temperature. This solution may or may not contain other compounding ingredients.

Glazed or non-porous forms for producing the desired articles are utilized, these forms preferably being hollow and heated in any suitable way, as by heated fluids from an outside source, electrical heating elements in the forms, or fluids heated in the forms by electrical heating elements arranged therein. These forms are heated to a vulcanizing temperature and are immersed in the solution and remain therein a sufficient time to vulcanize or partially vulcanize a film of rubber thereon.

The forms are then removed, the heat inside reduced and heat applied to the exterior of the forms to dry the rubber deposited thereon. If desired, the foregoing dipping operation may be repeated to obtain a wall of rubber of any desired thickness, the temperature within the forms being regulated according to the thickness of the article.

The articles may then be further cured on the forms by any adaptable method, for instance, they may be cured in steam or vapor at the required temperature, immersed in a fluid such as mercury or water heated to the proper curing temperature and, if desired, under pressure, i. e. air under pressure may be employed in the vulcanizing chamber to compress the fluid against the form to solidify the deposited rubber.

The completed articles are then reversely stripped from the forms, presenting extremely smooth outer surfaces enhancing the appearance thereof.

The method is capable of effective use in the manufacture of toy balloons, finger cots, nipples, gloves and many other articles.

Modifications of the invention may be resorted to without departing from the spirit thereof or the scope of the appended claims.

What is claimed is:

1. A method for making rubber articles by dipping which comprises providing a solution of concentrated latex containing a vulcanizing agent and an accelerator of vulcanization, immersing a glazed form heated to a vulcanizing temperature in the solution for sufficient time to vulcanize a film of rubber thereon, removing the form from the solution, reducing the temperature of the form, heating the exterior of the deposited rubber on the form to dry the same, repeating the four last-named steps of the method to obtain an article of the desired thickness, and further vulcanizing the article by application of heat and pressure to the exterior thereof.

2. A method for making rubber articles by dipping which comprises providing a solution of concentrated latex containing a vulcanizing agent and an accelerator of vulcanization, immersing a glazed form heated to a vulcanizing temperature in the solution for sufficient time to vulcanize a film of rubber thereon, removing the form from the solution, reducing the temperature of the form, heating the exterior of the deposited rubber on the form to dry the same, and further vulcanizing the article by application of heat and pressure to the exterior thereof.

3. A method for making rubber articles by dipping which comprises providing a solution of concentrated latex containing a vulcanizing agent and an accelerator of vulcanization, immersing a glazed form heated to a vulcanizing temperature in the solution for sufficient time to vulcanize a film of rubber thereon, removing the form from the solution, reducing the temperature of the form, heating the exterior of the deposited rubber on the form to dry the same, repeating the four last-named steps of the method to obtain an article of the desired thickness, and further vulcanizing the article.

4. A method for making rubber articles by dipping which comprises providing a solution of concentrated latex containing a vulcanizing agent and an accelerator of vulcanization, immersing a glazed form heated to a vulcanizing temperature in the solution for sufficient time to vulcanize a film of rubber thereon, removing the form from the solution, reducing the temperature of the form, heating the exterior of the deposited rubber on the form to dry the same, and further vulcanizing the article.

5. A method for making rubber articles by dipping which comprises providing a solution of vulcanizable latex containing an accelerator of vulcanization, immersing a form heated to a vulcanizing temperature in the solution for sufficient time to vulcanize a film of rubber thereon, removing the form from the solution, reducing the temperature of the form upon removal, drying the film of rubber on the form, and further vulcanizing the article.

6. A method for making rubber articles by dipping which comprises providing a solution of vulcanizable latex containing an accelerator of vulcanization, immersing a form heated to a vulcanizing temperature in the solution for sufficient time to vulcanize a film of rubber thereon, removing the form from the solution, and further vulcanizing the article.

7. A method of making rubber articles by dipping which comprises providing a solution of vulcanizable latex containing an accelerator of vulcanization, immersing a form heated to a vulcanizing temperature in the solution for sufficient time to vulcanize a film of rubber thereon, removing the form from the solution, drying the film of rubber on the form, and further vulcanizing the article.

8. A method for making rubber articles by dipping which comprises providing a solution of vulcanizable rubber containing an accelerator, immersing a form heated to a vulcanizing temperature in the solution for sufficient time to vulcanize a film of rubber thereon, removing the form from the solution, drying the article on the form, and further vulcanizing the article.

9. A method for making rubber articles by dipping which comprises providing a solution of vulcanizable rubber containing an accelerator, immersing a form heated to a vulcanizing temperature in the solution for sufficient time to vulcanize a film of rubber thereon, removing the form from the solution, and further vulcanizing the article.

10. A method for making rubber articles by dipping which comprises providing a solution of vulcanizable rubber containing an accelerator, immersing a form heated to a vulcanizing temperature in the solution for sufficient time to vulcanize a film of rubber thereon, and removing the form from the solution.

JOHN HADFIELD.